May 19, 1931. L. L. PRATT 1,806,081
LUBRICATED EXPANSION JOINT
Filed April 21, 1926
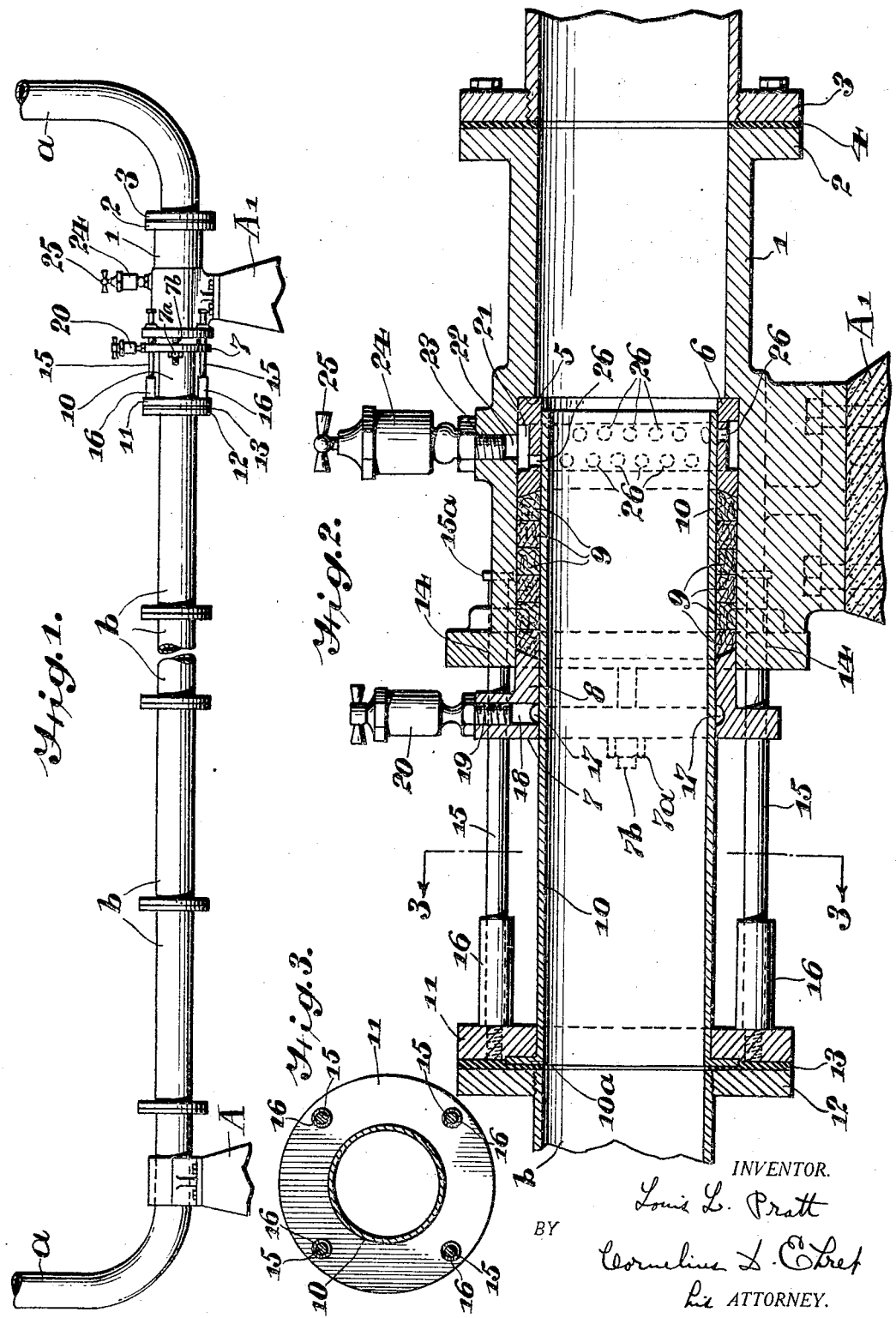
INVENTOR.
Louis L. Pratt
BY
Cornelius D. Ehret
his ATTORNEY.

Patented May 19, 1931

1,806,081

UNITED STATES PATENT OFFICE

LOUIS L. PRATT, OF PHILADELPHIA, PENNSYLVANIA, ASSIGNOR TO C. H. WHEELER MANUFACTURING COMPANY, OF PHILADELPHIA, PENNSYLVANIA, A CORPORATION OF PENNSYLVANIA

LUBRICATED EXPANSION JOINT

Application filed April 21, 1926. Serial No. 103,431.

My invention relates to features and details of construction of a lubricated expansion joint.

In accordance with my invention, there is provided an expansion joint comprising a housing formed with an axial bore within which slides a member or tube forming the terminal of a conduit system upon expansion and contraction of said system under the influence of varying temperatures of a vapor passing therethrough, and for preventing escape of such vapor there is utilized a gland, follower member, and interposed packing material disposed between the inner wall of said housing and the outer wall of said member, to which is supplied a lubricant that usually diffuses or spreads over substantially the inner surface of said gland, follower member and packing.

Further in accordance with my invention, there is provided an expansion joint comprising a housing formed with an axial recess within which slides the terminal of a conduit system, and for preventing escape of vapor from said housing along a path extending exteriorly of said terminal there is utilized a gland or the like lying wholly within said housing and which is supplied with lubricant to be thereafter passed into engagement with the exterior surface of said terminal.

My invention resides in structure of the character hereinafter described and claimed.

For an understanding of one of the various forms my invention may take, reference is to be had to the accompanying drawings, in which:

Fig. 1 is a side elevational view of a conduit span which in one supporting region is supplied with apparatus constructed in accordance with my invention.

Fig. 2 is a vertical sectional view of apparatus constructed in accordance with my invention.

Fig. 3 is a transverse vertical sectional view taken on the line 3—3 of Fig. 2.

In systems involving the transfer of a vapor medium as live steam, it is customary to utilize a conduit supported, for example, in but two regions spaced a substantial distance apart. A conduit of this character is indicated in Fig. 1 as comprising the curved end sections $a$ and a variable number of sections $b$, the entire conduit system being supported on the pillars or supports A and A1 separated a suitable distance, as two hundred feet, more or less.

To care for the expansion of the span comprising the sections $b$ resulting from the passage therethrough of a hot vapor medium, I have illustrated in Fig. 2 a type of expansible joint well known in the art. As herein shown, support A1 has secured thereto a casing or housing structure 1 terminating at one end in the flange 2, to which is secured a flange 3 on the end of a section $a$, a gasket 4 being interposed between the two flanges.

Preferably at a point substantially midway between its ends, the bore of housing 1 is increased in diameter, thereby providing a shoulder 5 against which abuts the ring or guide lantern gland 6, preferably constructed of bronze. A follower member 7 comprises a sleeve 8 freely slidable within the enlarged bore of housing 1. Between the beveled ends of sleeve 8 and gland 6 is interposed a plurality of independent sections of packing 9 of suitable composition. Follower 7 may be held in adjusted position with respect to the adjacent end of housing member 1 by a plurality of adjusting nuts 7a respectively threaded to circumferentially spaced bolts 7b carried by said housing member and with respect to which follower 7 is freely slidable.

Slidable within follower 7 and gland 6, both of which have the same interior diameter, and in abutting relation with the packing 9, is the sliding tube 10, preferably of steel plated with a metal of the so-called non-corrosive group, as copper or nickle, the flanged end 10a of said tube being secured to a collar 11 suitably secured to the flange 12 of a section b, a suitable gasket 13 being interposed between flange 12 and collar 11.

Carried by collar 11 and slidable in suitable clearance holes 14 comprised in the flanged end of housing member 1 are the rods or bars 15, enlarged at one end as indicated at 15a. Each rod 15 carries a collar or cylinder 16 and follower member 7 is suitably recessed to permit free sliding movement of rods 15 and collars 16.

As shown in Fig. 2, follower member 7 may be provided with a circumferential groove 17 opening into a passage 18, into which is threaded a nozzle 19 of a grease cup 20.

During progressive increase in the temperature of conduit sections b traversed by the hot vapor medium, the conduit span comprising the sections b progressively increases in length, the tube 10 moving toward the right, as viewed in Fig. 1. If the increase in temperature becomes sufficiently great, collars 16 are finally moved into engagement with the flanged end of housing 1, in which are formed the clearance holes 14, thereby limiting or preventing further movement of tube 10 toward the right, Fig. 1.

The construction described above, although well known in the art, sometimes proved unsatisfactory in operation, due to lack of proper lubrication between the surface of tube 10 contacting with gland 6 and packing 9.

In accordance with my invention, this defect in the prior art construction is overcome in a novel manner by feeding lubricant from the ring or gland 6 into engagement with the exterior surface of tube 10. To this end, and as shown in Fig. 1, gland 6 is provided with a circumferential channel or groove 21 of suitable width and with which communicates a passage 22 formed in housing member 1, the stem 23 of a suitable lubricating device, as the grease cup 24 of a type well known in the art opening into passage 22, the lubricant preferably a mixture of high temperature grease and graphite, being forced into channel 21 upon actuation of handle 25 of lubricator 24.

Channel 21 is placed in communication with the exterior surface of tube 10 by the holes or perforations 26 passing through the wall of ring or gland 6. By preference, a plurality of rows of such perforations are provided, those in one row being staggered with respect to those in an adjacent row.

Ordinarily, the pressure in the vapor line and housing member 1 is substantially in excess of atmospheric pressure. Accordingly, there is a decided tendency for the lubricant emitted from passages 26 to be forced from the right toward the left, Fig. 1, between the exterior surface of tube 10 and the surfaces of gland 6, packing 9 and follower 8 contacting therewith by vapor escaping, or tending to escape, to the atmosphere beyond follower 7. Particularly, due to this action, there is provided a film of lubricant between those surfaces movable relatively to each other, thereby enhancing the utility and efficiency of a device of the character described.

In the appended claims, the term "gland" shall be understood as limited to a lubricated bearing member, as ring 6 or equivalent, always wholly within housing 1 and whose function is the same no matter whether integral or separate from said housing.

What I claim is:

1. The combination with expansion joint construction including male and female members having their respective free-end portions associated for relative movement longitudinally of said construction, and packing means interposed between said free-end portions, of means providing for application of lubricant to the outer surface of the free-end portion of said male member at a region in such construction intermediate said packing means and the free-edge portion of said male member such that applied lubricant is forced along the outer surface of said male member and between the same and said packing means under the influence of pressure conditions in said female member.

2. The combination with expansion joint construction including male and female members having their respective free-end portions associated for relative movement longitudinally of said construction, packing means interposed between said free-end portions, and means interposed between said free-end portions and receiving the free-edge portion of said male member and providing a bearing for the latter, of means providing for application of lubricant to the outer surface of said free-edge portion by way of said bearing means such that applied lubricant is forced along the outer surface of said free-end portion and between the same and said packing means under the influence of pressure conditions in said female member.

3. Expansion joint construction comprising male and female members having their respective free-end portions associated for relative movement longitudinally of said construction, a member interposed between said members and receiving the free-edge portion of said male member and providing a bearing therefor, said bearing member provided with a passage extending through the same, and means providing for the feeding of lubricant through a wall of said female member to the outer surface of said free-edge portion of said male member by way of said passage.

4. Expansion joint construction comprising male and female members having their respective free-end portions associated for relative movement longitudinally of said construction, a ring interposed between said members and receiving the free-edge portion of said male member and providing a bearing therefor, said ring provided on the outer surface thereof with a groove and with circumferentially-spaced openings through the wall of said ring at said groove, and means providing for the feeding of lubricant through a wall of said female member into said groove.

LOUIS L. PRATT.